United States Patent
Lebez et al.

[11] Patent Number: 5,994,437
[45] Date of Patent: *Nov. 30, 1999

[54] HOT MELT ADHESIVE COMPOSITIONS

[75] Inventors: Jean Lebez, Evreux; Jean-Michel Pierrot, Grosley sur Risle; Eric Radigon, Bernay, all of France

[73] Assignee: Elf Atochem S.A., Puteaux, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/491,431

[22] Filed: Jun. 12, 1995

[30] Foreign Application Priority Data

Jun. 13, 1994 [FR] France ................................. 94 07178

[51] Int. Cl.$^6$ ..................................... C08L 23/10
[52] U.S. Cl. ......................... 524/271; 524/275; 524/277; 525/227
[58] Field of Search ................................. 524/271, 275, 524/277; 525/227

[56] References Cited

U.S. PATENT DOCUMENTS

| | | |
|---|---|---|
| 4,374,882 | 2/1983 | Harlan ..................................... 525/227 |
| 4,460,728 | 7/1984 | Schmidt ................................... 524/271 |
| 4,665,130 | 5/1987 | Hwo ....................................... 525/227 |
| 4,680,330 | 7/1987 | Berrier ................................... 524/230 |
| 4,816,306 | 3/1989 | Brady et al. ......................... 428/36.92 |
| 4,833,195 | 5/1989 | Adur ...................................... 525/227 |
| 4,877,663 | 10/1989 | Kambe .................................. 525/227 |
| 4,916,190 | 4/1990 | Hwo ....................................... 525/227 |
| 5,087,667 | 2/1992 | Hwo ....................................... 525/227 |
| 5,326,602 | 7/1994 | Rifi ........................................ 525/227 |
| 5,397,843 | 3/1995 | Lakshmanan .......................... 525/227 |
| 5,454,909 | 10/1995 | Morganelli ............................ 524/271 |
| 5,500,472 | 3/1996 | Liedermooy ........................... 524/277 |

OTHER PUBLICATIONS

Mitsui, Derwent WPI, AN 85–1679 Dec. 28, (1985).

*Primary Examiner*—Paul R. Michl

[57] ABSTRACT

The invention is a thermofusible adhesive composition comprising:

<u>a</u> at least one essentially amorphous poly(alpha-olefin),

<u>b</u> at least one copolymer of ethylene and an alkyl (meth) acrylate, the cloud point being below 170° C.

20 Claims, No Drawings

HOT MELT ADHESIVE COMPOSITIONS

FIELD OF THE INVENTION

The present invention relates to thermofusible, or "hot-melt", adhesive compositions. The thermofusible adhesive compositions of the present invention comprise: a.) at least one substantially amorphous poly(alpha-olefin), and b.) at least one copolymer of ethylene and an alkyl (meth)acrylate.

BACKGROUND OF THE INVENTION

Thermofusible, or "hot-melt", adhesives are solid at room temperature. It suffices to melt them by heating between 150 and 200° C., setting occurring by cooling.

The main constituents of a thermofusible adhesive are: a base copolymer, a tackifying resin, waxes, stabilizers, and optionally fillers.

Polyolefins, copolymers thereof, polyamides, and so on, may be used as the base copolymer. The base copolymer constitutes the core of the hot melt. It provides and determines its general properties, in particular, cohesion, thermal behavior, and stability.

The tackifying resin imparts better hot adhesive power to the thermofusible adhesive, and thus better adhesion at the application temperatures.

The waxes make it possible to control the viscosity and to modify the rheological curve of the base polymer as a function of the temperature.

The stabilizers are antioxidants or anti-UV agents. They increase the resistance to ageing of the mixture.

The plasticizers modify the cold properties of the hot-melt and in particular the flexibility of the adhesively bonded joint.

U.S. Pat. No. 4,816,306 of the prior art describes thermofusible adhesives composed of:

a. 35 to 45% by weight of the ethylene/n-butyl acrylate copolymer;

b. 35 to 55% of a tackifying resin;

c. 10 to 20% of a wax with a high melting point.

Application JP 60 096676 KOKAI published on May 30, 1985 describes thermofusible adhesives consisting of:

A 100 parts of polymers:

Aa 25 to 75% of an ethylene copolymer,

Ab 75 to 25% of an ethylene/unsaturated carboxylic acid ester copolymer, and

B 25 to 200 parts of a tackifying resin;

at least one of the polymers A being grafted with an unsaturated carboxylic acid or a derivative and the viscosity of these adhesives being, at 180° C., less than 50 Pascal seconds.

The examples show that Aa is chosen from ethylene-propylene or ethylene-butene rubbers and Ab is an ethylene/ethyl acrylate copolymer, at least one being grafted with maleic anhydride.

The quality of the adhesion obtained is measured by the SAFT test according to ASTM D 4498, which measures the cohesion limit temperature at shear, and by the T peeling test according to ASTM 1876-72.

SUMMARY OF THE INVENTION

New thermofusible adhesive compositions have now been found which are stronger in the SAFT test and in the T peeling test and which do not require grafting.

The present invention is a thermofusible adhesive composition comprising:

a at least one essentially amorphous poly(alpha-olefin), b at least one copolymer of ethylene and an alkyl (meth) acrylate, the cloud point of the composition being below 170° C.

DESCRIPTION OF THE PREFERRED EMBODIMENTS

The essentially amorphous poly(alpha-olefins) are referred to as "APAOs" hereinafter. APAOs of the compositions of the invention advantageously have at least one of the following characteristics:

viscosity at 190° C. between 3000 and 50,000 mPa s, softening temperature (bead and ring, ASTM D 28) between 80 and 160° C., needle penetration (0.1 mm) of 4 to 21, density at 23° C. between 0.85 and 0.9 g/cm$^3$, viscosity index (J) between 40 and 95 cm$^3$/g, molecular weight MW between 30,000 and 75,000, intrinsic viscosity (100 ml/g) between 0.4 and 0.9.

The substantially amorphous poly(alpha-olefin) a of the invention is preferably made from the alpha-olefins ethylene, propylene, butene, and hexene. In accordance with the present invention, the substantially amorphous poly (alpha-olefin) may be an ethylene/propylene, propylene/butene, or ethylene/hexene copolymer. However, ethylene/propylene/butene copolymers with a high butene content, ethylene/propylene/butene copolymers with a high propylene content, or butene homo- or copolymers are preferred.

The alkyl group of the alkyl (meth)acrylate of the copolymer b may be linear, branched or cyclic, and may have up to 20 carbon atoms. Isobutyl acrylate, 2-ethylhexyl acrylate, cyclohexyl acrylate, and propyl (meth)acrylate are illustrative. n-Butyl acrylate is preferred. The copolymer b may contain 20 to 45% by weight of alkyl (meth)acrylate, and preferably 26–40%.

The compositions of the invention are prepared by simple mixing of the various products a and b in the molten state.

In order to measure the cloud point, the composition of the invention is heated to 180° C.; it is stirred until homogenized, a thermometer is inserted into the composition and time is allowed for the temperature to stabilize. The temperature at which the composition remaining on the end of the thermometer begins to cloud is noted. The value read corresponds to the cloud point.

The cloud point measures the compatibility of the various components of the thermofusible adhesive.

Homogenous compositions are thus obtained, they are easier to prepare and may be stored. They are also easier to use, there is no risk of separation of the constituents or of blocking of the equipment during use.

The Applicant has discovered that most of the essentially amorphous poly(alpha-olefins) and of the copolymers b are compatible and thus the cloud point is below 170° C. A person skilled in the art may easily choose the proportions of a and b and the various properties of the products a and b in order to obtain a cloud point below 170° C. It would not be departing from the scope of the invention to add a small amount of a crystalline polyolefin or poly(alpha-olefin) to the composition of the invention, provided that the cloud point of the composition is below 170° C.

The proportions of a and b may vary within a wide range. Good results are obtained with weight proportions of 60 parts to 20 parts of a per 20 to 80 parts of b. 30 to 50 parts of (a) per 8 to 20 parts of (b) are preferably used.

The cloud point is advantageously below 165° C.

The compositions of the invention may also comprise tackifying resins, waxes, plasticizers and stabilizers.

As regards the tackifying resins, those of low polarity and free of any unsaturation, such as polyterpene resins, terpene resins, essentially aliphatic hydrocarbon resins and esterified and hydrogenated colophony resins, are advantageously used. The terpene resins are, for example, those derived from alpha-pinene, beta-pinene or dipentene. The essentially aliphatic hydrocarbon resins result from the catalytic or thermal polymerization of petroleum fractions rich in olefins and diolefins.

The Applicant has discovered that the tackifying and breaking elongation properties of the thermofusible adhesive of the invention are increased by these tackifying resins; however, the breaking forces are decreased.

As regards the waxes, polyethylene waxes, microcrystalline waxes or Fisher-Tropsh waxes advantageously used; they lower the viscosity and modify the open time and the setting time.

The open time denotes the time required for the thermofusible adhesive to pass from the liquid form to the more or less solid form which no longer allows the adhesive bonding. The setting time denotes the time taken for the assembly to become integral.

The room temperature, the temperature of the support, that of the thermofusible adhesive and the amount of adhesive deposited may modify the open time.

As regards the plasticizers, aliphatic or naphthenic oils may be used.

Anti-UV stabilizers and antioxidants are also added.

A person skilled in the art can readily determine the possible amounts of tackifying resin, of waxes, of plasticizers and of stabilizers as a function of the desired adhesion properties or the desired viscosity; the open time, and the nature and surface state of the materials to be adhesively bonded.

The amount of poly(alpha-olefin) a and of copolymer b may be from 100 parts per 50 to 200 parts of the tackifying resin, waxes plasticizers and stabilizers altogether.

The Applicant has discovered that the tackifying resins, the waxes and the plasticizers mentioned above were compatible with the compounds a and b of the invention. Thermofusible adhesives having a cloud point below 170° C. are thus obtained. The Applicant has noted that the compounds a and b were particularly compatible, and hence compositions consisting only of the products a and b have a cloud point very much below 170° C.

A person skilled in the art can advantageously select the products a and b such that the cloud point of the composition consisting of a and b alone is below 100° C. and preferably between 30 and 75° C.

Thus, by adding the tackifying resin, the waxes and the plasticizers, an adhesive having a cloud point below 170° C. is obtained.

EXAMPLES

Thermofusible adhesives were prepared from the following products:

Ethylene Copolymers b

| No. | Copolymer | Supplier | Reference | MI (g/10 min) | % co-monomer by weight |
|---|---|---|---|---|---|
| A | n-Butyl acrylate | ELF ATOCHEM | 35 BA 320 | 320 | 35 |
| B | n-Butyl acrylate | ELF ATOCHEM | 35 BA 150 | 150 | 35 |
| C | n-Butyl acrylate | ELF ATOCHEM | 35 BA 40 | 40 | 35 |
| D | n-Butyl acrylate | ELF ATOCHEM | 28 BA 400 | 400 | 28 |
| E | n-Butyl acrylate | ELF ATOCHEM | 28 BA 175 | 175 | 28 |
| F | Methyl acrylate | ELF ATOCHEM | 28 MA 400 | 400 | 28 |
| G | Vinyl acetate | ELF ATOCHEM | 33,400 | 400 | 33 |
| H | Vinyl acetate | ELF ATOCHEM | 28,420 | 420 | 28 |
| I | Vinyl acetate | ELF ATOCHEM | 28,150 | 150 | 28 |

The weight content of comonomers was determined by infrared.

Tackifying Resins

| No. | Supplier | Reference | Nature of the resin |
|---|---|---|---|
| J | HERCULES | Regalite R 125 | Hydrocarbon resin |
| K | GOODYEAR | Wingtack 95 | Hydrocarbon resin |
| L | HERCULES | Foral AX | Hydrogenated colophony |
| M | HERCULES | Foral 85 | Colophony ester |

Plasticizers

| No. | Supplier | Reference | Nature of the resin |
|---|---|---|---|
| N | BP | NAPVIS BP 10 | Polyisobutene |
| O | SHELL | CATENEX N 956 | Liquid paraffin |

Amorphous Olefin Copolymers

| No. | Supplier | Reference | Nature of the resin |
|---|---|---|---|
| P | HÜLS | VESTOPLAST ® 508 | C2/C3/C4* |
| Q | HÜLS | VESTOPLAST ® 608 | C2/C3/C4* |
| R | HÜLS | VESTOPLAST ® 708 | C2/C3*/C4 |

*: Major comonomer.

The characteristics of the copolymer P, Q and R are as follows:

| | P | Q | R |
|---|---|---|---|
| Viscosity at 190° C., mPa s | 8,000 | 8,000 | 8,000 |
| Bead and ring softening temperature ASTM D 28 | 85 | 155 | 105 |

-continued

|  | P | Q | R |
|---|---|---|---|
| Needle penetration (0.1 mm) | 15 | 18 | 20 |
| Density at 23° C. (g/cm$^3$) | 0.87 | 0.87 | 0.87 |
| Viscosity index "J" (cm$^3$/g) | 55 | 55 | 55 |
| Molecular weight (MW) | 45,000 | 45,000 | 45,000 |
| Intrinsic viscosity (100 ml/g) | 0.55 | 0.55 | 0.55 |

All the formulations of these thermofusible adhesives are stabilized with 3,000 ppm of Irganox 1010.

Hence, the following are examples of thermofusible adhesives and the corresponding evaluations. The weight proportions are indicated in the corresponding columns of the table.

| EXAMPLES | OLEFINIC AMORPHOUS COPOLYMER A 40% | ETHYLENIC COPOLYMER B 10% | TACKIFYING RESIN 30% | PLASTICIZERS 20% | CLOUD POINT °C. | BEAD RING TEMPERATURE °C. ASTM D 28 | BROOKFIELD VISCOSITY AT 10 REV/MIN mPa s A7 ASTM 3236 | SAFT °C. ASTM 4498 | T PEELING ALU/ALU (N/cm) AT 23° C. ASTM 1876 | CREEP AT 50° C. ALU/ALU (MINUTES) LOAD 500 g |
|---|---|---|---|---|---|---|---|---|---|---|
| 1 | Q | I | J | N | >190 | 49 | 2200 | 56 | 8 | 5 |
| 2 | Q | B | J | N | 140 | 54 | 2600 | 59 | 8.4 | 5.30* |
| 3 | Q | I | K | N | >190 | 48 | 2300 | 54 | 7.2 | 5 |
| 4 | Q | B | K | N | 140 | 55 | 2550 | 58 | 7.8 | 5.30* |
| 5 | Q | I | L | N | >190 | 49 | 2320 | 54 | 7 | 5 |
| 6 | Q | B | L | N | 150 | 55 | 2500 | 57 | 7.5 | 5.30* |
| 7 | R | I | J | N | >190 | 47 | 2420 | 55 | 7.6 | 4 |
| 8 | R | B | J | N | 160 | 51 | 2300 | 58 | 8.1 | 5 |
| 9 | R | I | K | N | >190 | 48 | 2450 | 53 | 7.5 | 4 |
| 10 | R | B | K | N | 160 | 52 | 2400 | 56 | 8 | 5 |
| 11 | R | I | L | N | >190 | 47 | 2400 | 52 | 7.7 | 4 |
| 12 | R | B | L | N | 160 | 52 | 2580 | 55 | 8.2 | 5 |
| 13 | P | A | M | O | 140 | 70 | 2370 | 55 | 8 | 5 |
| 14 | P | B | M | O | 160 | 49 | 2500 | 55 | 8 | 5 |
| 15 | P | C | M | O | 160 | 48 | 2520 | 55 | 8.5 | 5 |
| 16 | P | D | M | O | 160 | 48 | 2420 | 55 | 8 | 5 |
| 17 | P | E | M | O | 158 | 48 | 2200 | 56 | 7.6 | 5 |
| 18 | P | F | M | O | 163 | 47 | 2280 | 53 | 7.3 | 4.30* |
| 19 | P | G | M | O | >190° C. INCOMPATIBLE | 45 | 2020 | 50 | 6.2 | 4 |
| 20 | P | H | M | O | >190° C. INCOMPATIBLE | 44 | 2050 | 49 | 6.8 | 4 |
| 21 | P | I | M | O | >190° C. INCOMPATIBLE | 44 | 2150 | 51 | 6.9 | 4 |

What is claimed is:

1. A hot melt adhesive composition comprising a base copolymer and a tackifying resin, wherein the base copolymer consists essentially of:

a.) at least one substantially amorphous poly(alpha-olefin) having a density of from 0.85 to 0.9 g/cm$^3$ and a molecular weight of from 30,000 to 75,000 and selected from the group consisting of ethylene/propylene copolymer, propylene/butene copolymer, ethylene/hexene copolymer, high butene content ethylene/propylene/butene copolymer, high propylene content ethylene/propylene/butene copolymer, butene homopolymer and butene copolymer, and b.) at least one copolymer of ethylene and an alkyl (meth)acrylate, wherein the composition is characterized by a cloud point below 170° C.

2. The composition of claim 1, wherein the cloud point of the composition is below 100° C.

3. The composition of claim 1, wherein the cloud point of the composition is between 30 and 75° C.

4. The composition of claim 1, which comprises from 30 to 50 parts by weight of component a) and from 8 to 20 parts by weight of component b).

5. The composition of claim 1, wherein the alkyl (meth)acrylate of componenet b.) is n-butyl acrylate.

6. The composition of claim 1, further comprising one or more members selected from the group consisting of waxes, plasticizers, and stabilizers.

7. The composition of claim 6, which comprises 100 parts by weight of components a.) and b.) to 50 to 200 parts by weight of said tackifying resins, waxes, plasticizers, and stabilizers.

8. The composition of claim 6, which comprises from 30 to 50% by weight of component a.), from 8 to 20 by weight of component b.), from 20 to 40% by weight of tackifying resin, and from 10 to 30% by weight of plasticizer.

9. The composition of claim 1, with the proviso that the poly(alpha-olefin) is not ethylene vinyl acetate copolymer.

10. The composition of claim 1, wherein the alkyl group of the alkyl (meth)acrylate of copolymer b.) comprises up to 20 carbon atoms.

11. The composition of claim 10, wherein the alkyl (meth)acrylate of the copolymer b.) is selected from the group consisting of isobutyl acrylate, 2-ethylhexyl acrylate, cyclohexyl acrylate, propyl (meth) acrylate, n-butyl acrylate and mixtures thereof.

12. The composition of claim 1, wherein the copolymer b.) comprises from 20% to 45% by weight of alkyl (meth)acrylate.

13. The composition of claim 1, which further comprises a small amount of a crystalline polyolefin or poly(alpha-olefin).

14. The composition of claim 1, further comprising one of more fillers.

15. The composition of claim 6, wherein the tackifying resin is selected from the group consisting of polyterpene resin, terpene resin, essentially aliphatic hydrocarbon resin, esterified colophony resin, hydrogenated colophony resin and mixtures thereof.

16. The composition of claim 6, wherein the wax is selected from a microcrystalline wax and a Fischer-Tropsh wax.

17. The composition of claim 6, wherein the plasticizer is selected from the group consisting of an aliphatic oil, a naphthelenic oil, polyisobutene, liquid paraffin and mixtures thereof.

18. The composition of claim 6, wherein the stabilizer is Irganox 1010.

19. A hot melt adhesive composition comprising a base copolymer and a tackifying resin, wherein the base copolymer consists essentially of:

a.) at least one substantially amorphous poly(alpha-olefin) having a density at 23° C. of from 0.85 to 0.9 g/cm$^3$ and a molecular weight of from 30,000 to 75,000 and selected from the group consisting of ethylene/propylene copolymer, propylene/butene copolymer, ethylene/hexane copolymer, high propylene content ethylene/propylene/butene copolymer, high butene content ethylene/propylene/butene copolymer, high propylene content ethylene/propylene/butene copolymer, butene homopolymer and butene copolymer, and b.) at least one copolymer of ethylene and an alkyl (meth)acrylate, wherein the composition is characterized by a shear adhesion failure temperature (SAFT) of greater than or equal to 53° C., a T peel strength of greater than or equal to 7.3 N/cm at 23° C. and a cloud point below 170° C.

20. The composition of claim 1, which comprises from 80 to 20 parts by weight of component a.) and from 20 to 80 parts by weight of component b.).

* * * * *